United States Patent [19]
Leon et al.

[11] Patent Number: 5,823,226
[45] Date of Patent: *Oct. 20, 1998

[54] AUTOMATIC VARIABLE-DEMAND FLOW REGULATOR

[75] Inventors: Eric Leon; Stephen Leon, both of Fort Lauderdale, Fla.

[73] Assignee: Water Management Equipment Ltd., Boca Raton, Fla.

[*] Notice: The term of this patent shall not extend beyond the expiration date of Pat. No. 5,704,390.

[21] Appl. No.: 927,218

[22] Filed: Sep. 10, 1997

Related U.S. Application Data

[63] Continuation-in-part of PCT/US97/02621 Feb. 19, 1997 and a continuation-in-part of Ser. No. 603,078, Feb. 20, 1996, Pat. No. 5,704,390.

[51] Int. Cl.$^6$ ........................ G05D 7/01
[52] U.S. Cl. .............. 137/357; 137/508; 137/516.11; 137/599
[58] Field of Search ............................. 137/357, 508, 137/512.1, 516.11, 543.15, 599

[56] References Cited

U.S. PATENT DOCUMENTS

| | | |
|---|---|---|
| 2,196,425 | 4/1940 | Neubling ........................ 137/599 X |
| 2,214,290 | 9/1940 | Ward . |
| 2,604,110 | 7/1952 | Gilder ................................. 137/357 |
| 3,042,061 | 7/1962 | Dobrikin . |
| 3,850,195 | 11/1974 | Olsson ......................... 137/516.11 X |
| 4,161,996 | 7/1979 | Dolejsi ......................... 137/516.11 X |
| 5,082,018 | 1/1992 | Caswell et al. ..................... 137/357 |
| 5,287,876 | 2/1994 | Takahashi ....................... 137/357 X |
| 5,379,797 | 1/1995 | Rogers et al. ................... 137/508 X |
| 5,704,390 | 1/1998 | Leon ............................ 137/512.1 X |

FOREIGN PATENT DOCUMENTS

| | | |
|---|---|---|
| 974852 | 9/1975 | Canada . |
| WO9730383 | 8/1997 | WIPO . |

*Primary Examiner*—Stephen M. Hepperle
*Attorney, Agent, or Firm*—Cooper & Dunham LLP

[57] ABSTRACT

A variable-demand flow regulator regulates water flow into a building based on variable water supply and variable demand pressures. When water demand increases downstream of the variable-demand flow regulator, the water pressure decreases on the downstream side of the piston valve and a piston of a piston valve moves in the downstream direction. This results in an increased number of access holes being exposed to water flow, thus allowing a higher flow of water when water demand increases. An adjustable bleeder valve controls the flow characteristics of the regulator by affecting the movement of the piston.

10 Claims, 11 Drawing Sheets

AUTOMATIC VARIABLE-DEMAND FLOW REGULATOR

CROSS-REFERENCE TO RELATED APPLICATIONS

This application is based on International Application No. PCT/US97/02621 filed Feb. 19, 1997 and is a continuation-in-part of U.S. application Ser. No. 08/603,078 filed Feb. 20, 1996 now U.S. Pat. No. 5,704,390.

BACKGROUND

This invention relates to water flow regulators, and in particular to an automatic variable-demand flow regulator with a movable piston valve that regulates and controls the flow of water based on water demand.

Many commercial residential buildings such as rental apartment buildings and condominium complexes have tenants pay for their monthly water bill as part of their rent or monthly condominium fee. In a typical apartment building, the main water line that supplies water to individual apartment units of the apartment building has only a single water flow meter for the entire apartment building. Tenants usually have little or no control over the water flow rate into their apartment units, and the tenants are charged for water usage based on the total volume of water used in the entire apartment building, as determined by the single water flow meter in the main water line.

The following is an example of how water flow rate can vary depending on water demand. If demand for water is high, such as during the morning hours, a user would use a relatively smaller total volume of water for a particular purpose during those high-demand morning hours than he would use for the same purpose during low-demand hours. In other words, during high-demand hours the water flow rate is lower and, therefore, a smaller volume of water will flow out of an outlet within a given amount of time. On the other hand, during low-demand hours, a greater volume of water will flow out of the same outlet within the same amount of time.

Tenants are responsible for paying for the greater usage of water during low-demand periods because apartment buildings typically do not have regulators that automatically adjust the water flow rate in response to water demand. However, tenants are usually not concerned about water conservation because their water usage fees are included in their rent or condominium maintenance fees. For example, apartment building tenants are less likely than homeowners to install water saving devices that restrict the flow of water into their homes, and when such devices are installed in apartment units (usually done by apartment building owners) these devices are often removed by the apartment building tenants. As a result, the water usage for the apartment building increases and all the apartment building tenants end up absorbing the costs for the increased volume of water used in the apartment building. Of course, water utility companies are not particularly concerned with the extra expense incurred by the apartment building tenants because an increased usage of water results in greater profits for the water utility companies.

Therefore, a need exists for an automatic variable-demand flow regulator for overcoming the problems presented above.

OBJECTS AND SUMMARY OF THE INVENTION

An object of the present invention is to provide a device for automatically regulating the flow of water through a water supply pipe using a piston valve.

Another object of the present invention is to provide a device for automatically regulating and controlling the flow of water based on demand.

Yet another object of the present invention is to provide an automatic flow regulation device that regulates water flow between a water flow meter for a main water supply line of a building and the building's water users.

According to an embodiment of the present invention, water consumption is automatically regulated and restricted by a mechanical device that uses a piston valve with a sliding piston to regulate the flow of water. The piston valve varies a flow area through which water must pass in order to reach a downstream demand outlet, and the flow area varies to reflect the varying demand for water. The position of the piston within the piston valve is controlled by water pressure at a supply side of the device and by water pressure at a demand side of the device. The piston is brought to a stationary position when equilibrium is reached and water pressure within the device is in a balanced state.

In order to achieve maximum efficiency, the device includes a compression spring that biases the piston toward the upstream supply side against the natural tendency of flowing water to push the piston toward the downstream demand side to a maximum opened position, which corresponds to a position of maximum water flow. When the piston valve is in a closed position, there is an equal water pressure on both sides of the piston so that the piston is in the stationary state and water flow through the device is minimal. The only flow realized is through small conduits in the piston and/or through flow around the periphery of the piston. The piston remains stationary in the minimal flow position until there is an increase in water demand downstream of the device. When demand increases on the downstream or outlet side of the device and the flow of water through the device is not adequate to provide an equal water pressure on both sides of the piston, the piston will respond to the imbalance in pressures by moving in the downstream direction toward the outlet side of the device to expose additional flow area for water to pass through, thus conveying additional water to the outlet side of the device. Simultaneously, the compression spring of the device is compressed when the piston moves in the downstream direction. The position of the piston adjusts until the pressure is equalized between the supply and demand sides of the piston. Therefore, the piston valve provides for a variable water flow that adjusts in response to water demand.

The device includes a bleeder valve, which enables adjustments to be made to the water flow characteristics of the device by controlling the movement of the piston. In order for the device to provide for maximum flow reduction, the bleeder valve has compression characteristics that are designed to permit a drop in pressure across the device without compromising or altering the water demand of the building.

The device includes a central access pipe with a closed upstream end, an open downstream end, and an arrangement of access holes therein through which water passes as it travels downstream. In operation, water flows into the access holes to a central conduit of the access pipe and exits downstream through the open end of the access pipe. The surface area of the access holes corresponds to the flow area discussed above, and flow rate is regulated by controlling the total flow area or the total surface area of the access holes that the water passes through. The access holes are arranged to provide maximum flexibility for the device under varying water demand and water flow conditions Each system or building for which such a device is to be installed is individually evaluated in order to determine desired water flow characteristics and appropriate compression spring and bleeder valve requirements.

According to another embodiment of the present invention, the device includes a bleeder or pressure differential valve installed between an intermediate inlet chamber and an outlet chamber. The pressure differential valve senses changes in downstream pressure and immediately discharges or dumps water from the intermediate inlet chamber into the outlet chamber when a low downstream pressure is sensed. When the water in the intermediate inlet chamber is discharged into the outlet chamber, the piston of the piston valve moves in the downstream direction towards the intermediate inlet chamber, thus exposing additional access holes on the access tube of the device for water to flow downstream into the outlet chamber toward the building's water demand location. When water demand ceases, the water pressure in the outlet chamber increases until it equilibrates with the water pressure in the intermediate inlet chamber. At that point, the pressure differential valve closes and the piston of the piston valve is biased to move in the upstream direction by action of the compression spring until equilibrium is reached and water pressure within the device is in a balanced state.

The device of the present invention regulates water flow continuously and enables automatic variable-demand water flow regulation.

DESCRIPTION OF PREFERRED EMBODIMENTS

Figure 1:
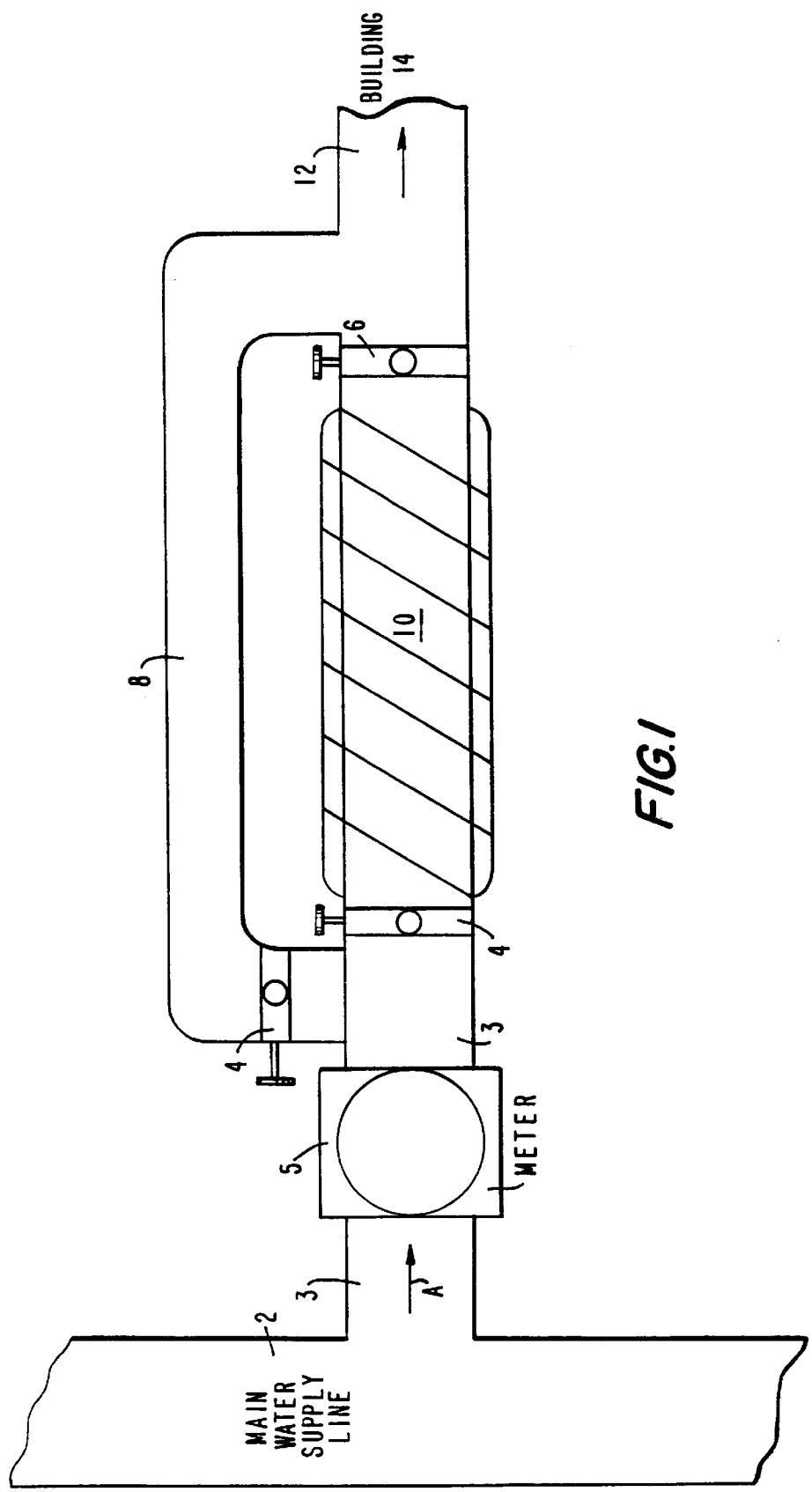
FIG. 1 is a plan view of a variable-demand flow regulator according to an embodiment of the present invention.

Preferred embodiments of the present invention are described below with reference to the accompanying drawings, in which like reference numerals represent the same or similar elements.

FIG. 1 is a plan view of a variable-demand flow regulator 10 positioned in a water line 3 between a main water supply line 2 and a building water line 12 connected to a building 14. The building 14 may be a residential apartment building, a condominium complex, an office building, and the like. Water flows from the main water supply line 2 into the water line 3 in the direction of arrow A. A single water flow meter 5 measures the volume of water supplied to the building 14. In a preferred embodiment, the variable-demand flow regulator 10 is positioned between the water flow meter 5 and the building water line 12. The variable-demand flow regulator 10 may be used in conjunction with bypass valves 4, 6 and a bypass line 8, which allow water to bypass the variable-demand flow regulator 10 so that maintenance service can be performed on the variable-demand flow regulator 10 without having to interrupt the supply of water to the building 14.

Figure 2:
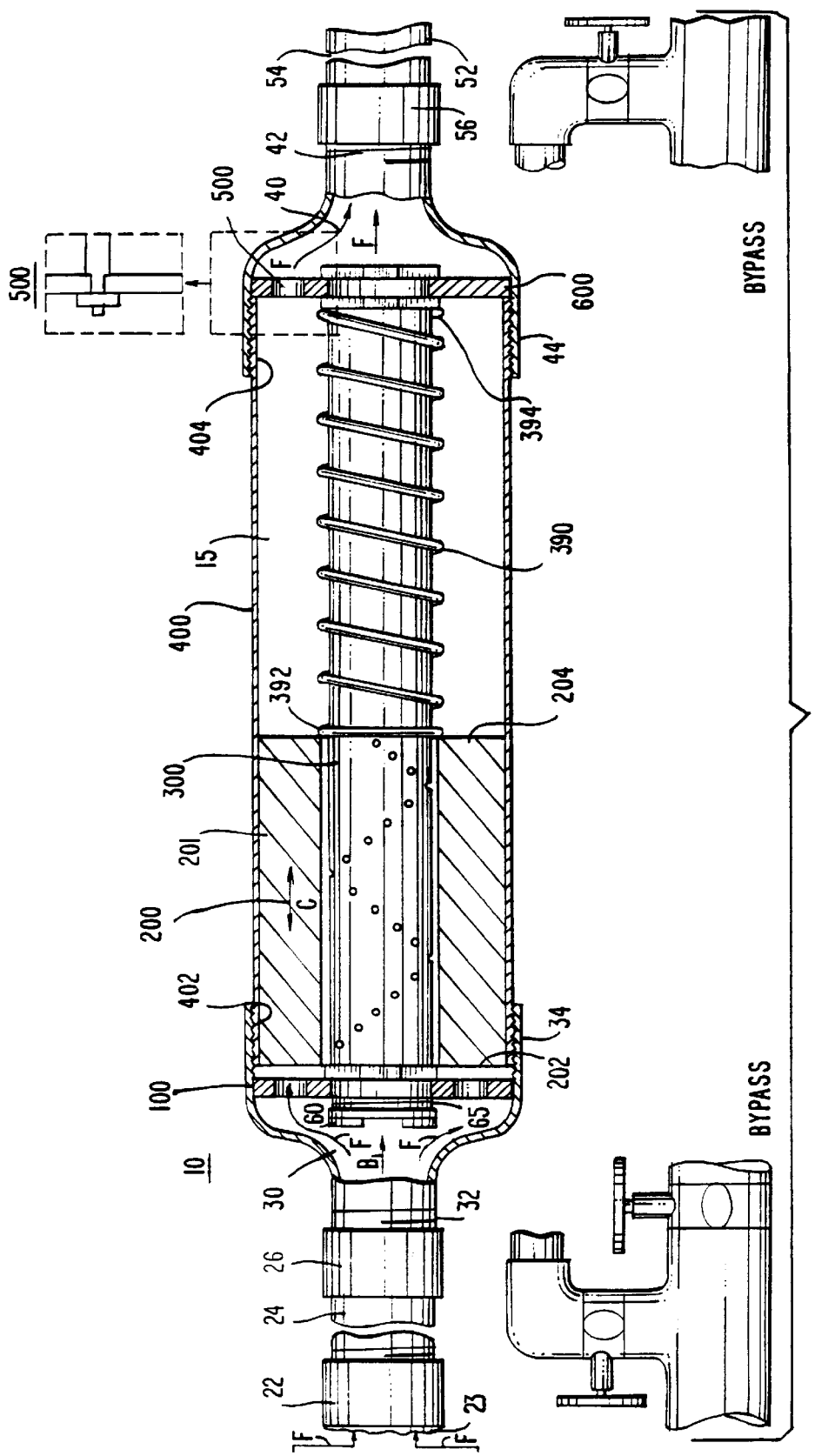
FIG. 2 is a cut-away view of the variable-demand flow demand regulator of FIG. 1.

FIG. 2 shows a partial view of the variable-demand flow regulator 10 of FIG. 1. The variable-demand flow regulator 10 includes an entry plate 100 (also shown in FIGS. 3A and 3B), a piston valve 200 (also shown in FIGS. 4A and 4B) with a piston 201 that slides back and forth in the directions indicated by double-arrow C, and an access pipe 300 (also shown in FIG. 5) extending through the piston valve 200. The piston 201 has a downstream end 204 that abuts against an upstream end 392 of a compression spring 390. A downstream end 394 of the compression spring 390 abuts against an upstream side of an exit plate 600 (also shown in FIGS. 8A and 8B). An adjustable bleeder valve 500 (also shown in FIGS. 7, 9A, and 9B) allows for operator control of the variable-demand flow regulator 10 so that an operator can adjust the piston valve 200 to produce desired flow characteristics by controlling the movement of the piston 201. The variable-demand flow regulator 10 may include inlet couplers 22, 26 threaded to mate with a coupling pipe 24. The inlet coupler 26 connects the coupling pipe 24 to an upstream end of a hollow inlet flange 30 which, in turn, is threaded on its downstream end to mate with an upstream end of an outer casing 400 (also shown in FIG. 6) of the variable-demand flow regulator. A hollow outlet flange 40 is threaded on its upstream end to mate with a downstream end of the outer casing 400. A downstream end of the outlet flange 40 is connected to an upstream end of a coupling pipe 54 by a coupler 56. A downstream end of the coupling pipe 54 is connected to a building water line 12 (shown in FIG. 1) by a coupler 52.

Figure 3B:
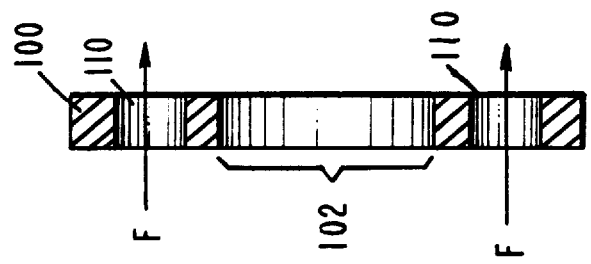
FIG. 3B is a side view of the entry plate of the variable-demand flow regulator of FIG. 2.
Figure 3A:
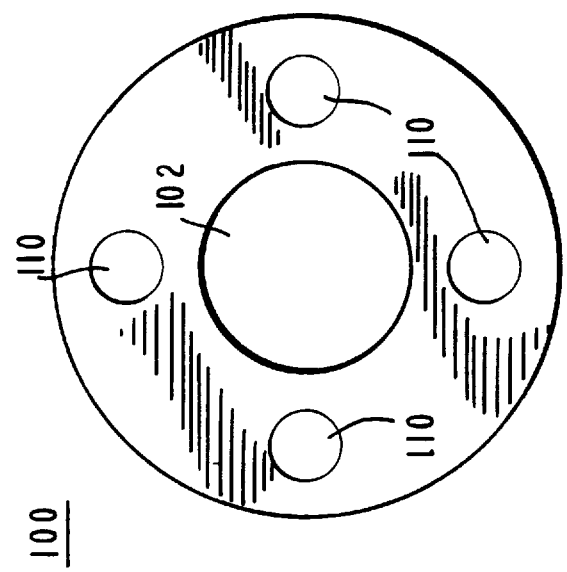
FIG. 3A is a front view of an entry plate of the variable-demand flow regulator of FIG. 2 as seen along arrow B.
Figure 5:
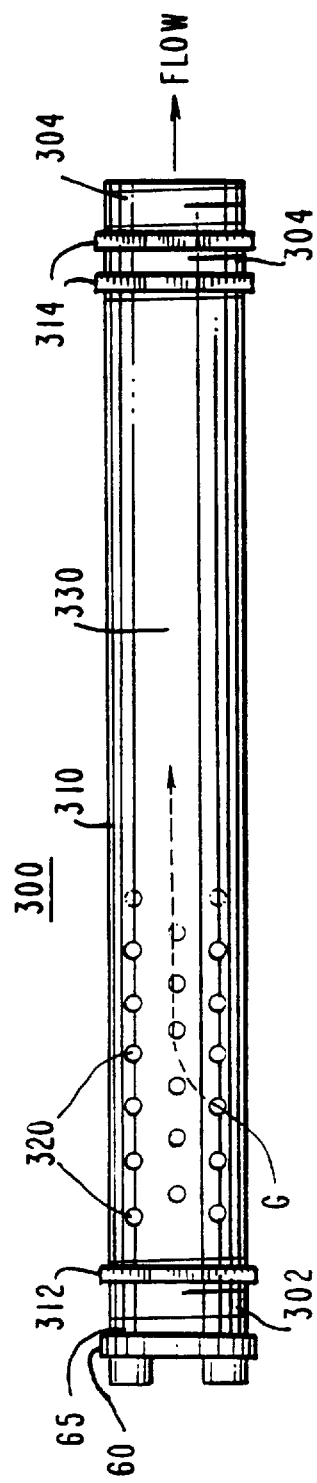
FIG. 5 is a side view an access pipe of the variable-demand flow regulator of FIG. 2.

FIG. 3A is a front view of the entry plate 100 of the variable-demand flow regulator 10 of FIG. 2 as seen along arrow B, and FIG. 3B is a side view of the entry plate 100 of the variable-demand flow regulator 10 of FIG. 2. The entry plate 100 has an annular shape with a central axial opening 102 and entry flow holes 110. The axial opening 102 fits around a threaded upstream end 302 of the access pipe 300, as shown in FIG. 5, and abuts against a nut 312. As shown in FIGS. 2 and 3B, water flows into the hollow inlet flange 30 and through the entry flow holes 110 of the entry plate 100, as indicated by the F arrows.

Figure 4B:
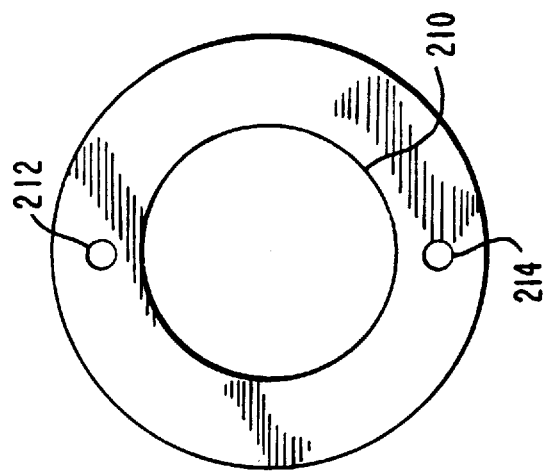
FIG. 4B is a front view of the piston valve of FIG. 2 as seen along arrow B.
Figure 4A:
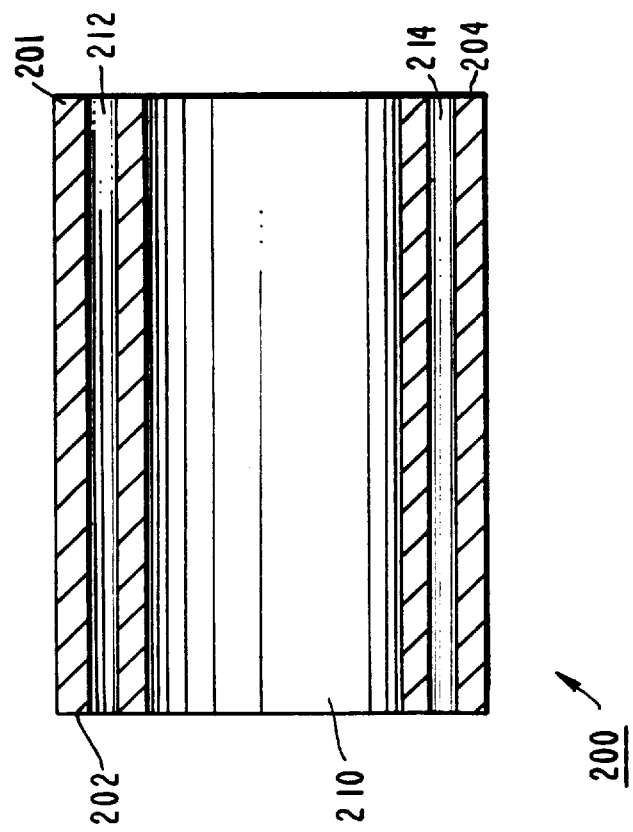
FIG. 4A is a side view of a piston valve of the variable-demand flow regulator of FIG. 2.

FIG. 4A is a side view of the piston valve 200 of the variable-demand flow regulator 10 of FIG. 2, and FIG. 4B is a front view of the piston valve 200 as seen along arrow B of FIG. 2. The piston valve 200 includes a piston 201, which may include small longitudinal conduits 212, 214 extending from an upstream end 202 to a downstream end 204. According to a preferred embodiment, the piston 201 does not include the conduits 212, 214 but instead the piston 201 is sized to allow water to flow around the outer periphery thereof. A central axial opening 210 is sized to slidingly receive the access pipe 300 therethrough. In operation, water flows into the inlet flange 30, through the entry flow holes 110 of the entry plate 100, through the conduits 212, 214 and/or around the outer periphery of the piston 201 into the intermediate inlet chamber 15 (shown in FIG. 2) of the variable-demand flow regulator 10. In addition, the flow of water through the flow holes 110 of the entry plate 100 exerts a pressure on the upstream end 202 of the piston 201 to push the piston 201 toward the downstream direction and push the downstream end 204 of the piston 201 against the upstream end 392 of the compression spring 390.

Figure 10:
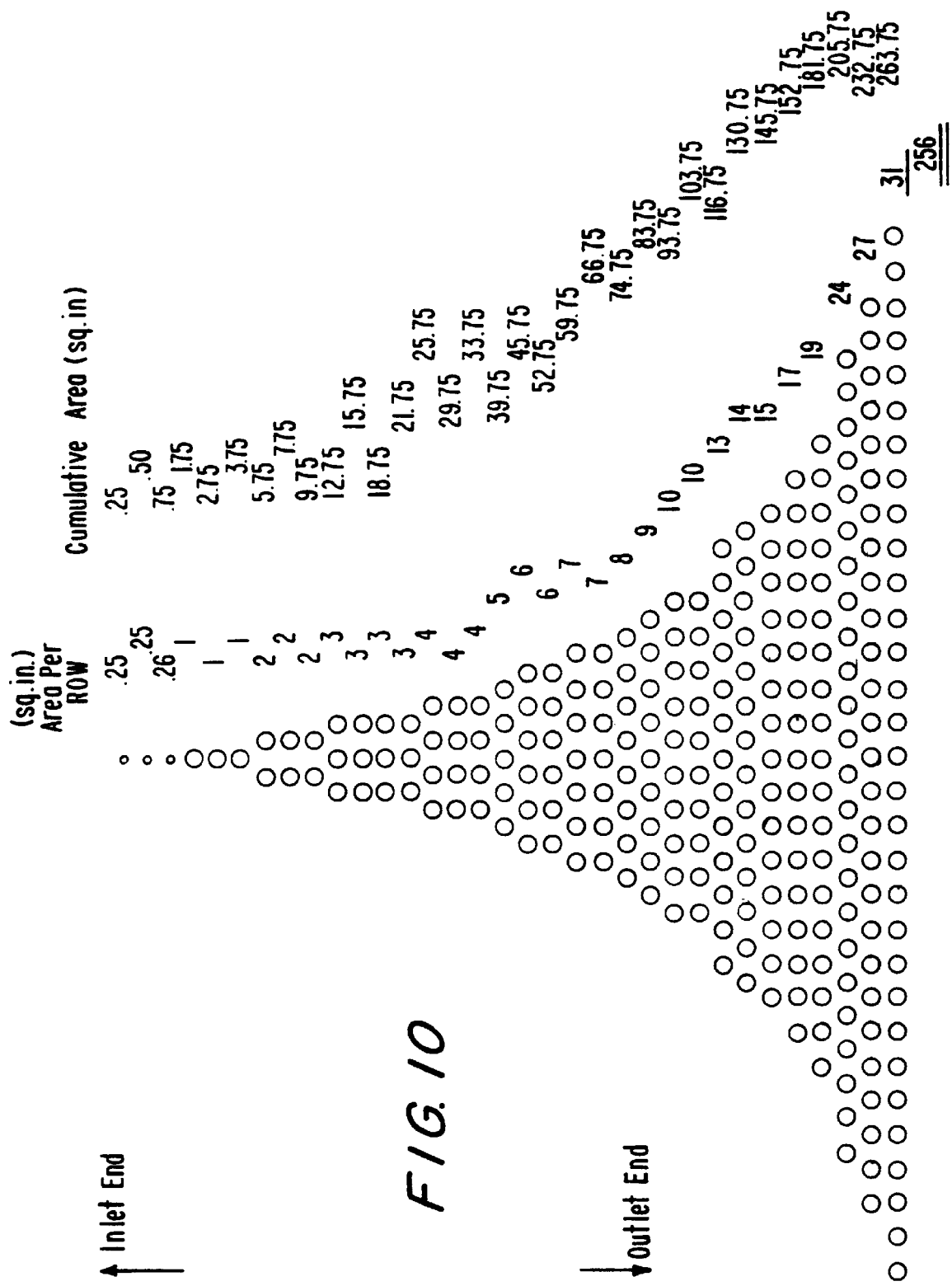
FIG. 10 shows an access hole pattern and lists the number of exposed access holes and the cumulative surface area of the exposed access holes for different positions of the piston of the variable-demand flow regulator of FIG. 2 according to a preferred embodiment.

FIG. 5 is a side view of the access pipe 300 of the variable-demand flow regulator 10 of FIG. 2. The access pipe 300 is provided with access holes 320 through which water flows. The access holes 320 may be specially arranged in a pattern that promotes desired flow characteristics, such as shown in FIG. 10.

Figure 8B:
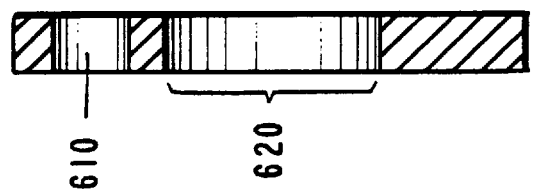
FIG. 8B is a side view of the exit plate of the variable-demand flow regulator of FIG. 2.
Figure 8A:
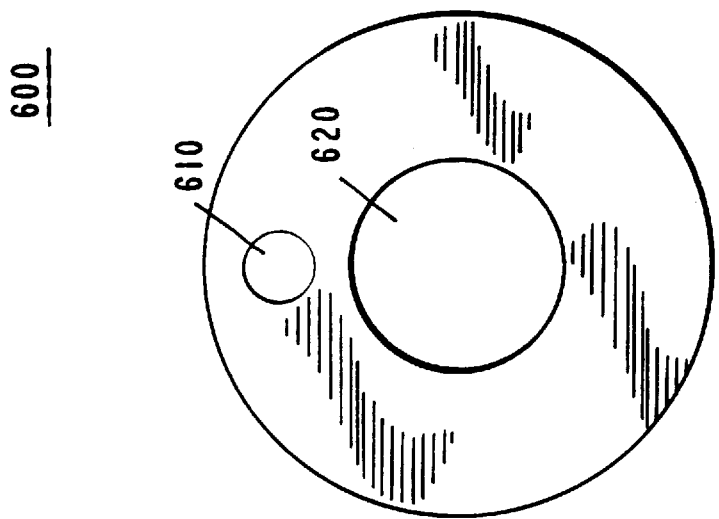
FIG. 8A is a front view of an exit plate of the variable-demand flow regulator of FIG. 2 as seen along arrow B.

Referring to FIGS. 2 and 5, the access pipe 300 extends through the central axial opening 210 of the piston 201. An endcap 60 closes off the upstream end 302 of the access pipe 300 from water flow and forces water to flow around the periphery of the piston 201 (and/or through the conduits 212, 214 in the piston 201) and through the exposed access holes 320. When the piston 201 moves in the downstream direction, some or all of the access holes 320 in the access pipe 300 are exposed to the water, thus allowing water to flow through the exposed access holes 320 into a central conduit 330 of the access pipe 300, as shown by arrow G in FIG. 5. Therefore, the greater the upstream water supply pressure in the main water supply line 2, the more the piston 201 moves in the downstream direction, resulting in a greater number of exposed access holes 320 along the access pipe 300. Optionally, lock nuts 314 may be used to hold the downstream end 304 of access pipe 300 in the central opening 620 of the exit plate 600, as shown in FIGS. 2 and 8A.

Referring to FIGS. 1, 2, and 5, the piston 201 adjusts its position according to changes in the water pressure in the main water supply line 2 and according to compression of the compression spring 390, which is affected by changes in water demand in the building 14. More specifically, when water demand in the building 14 increases, the water pressure on the downstream side 204 of the piston 201 decreases, thus allowing the piston 201 to move further in the downstream direction and subject the compression spring 390 to further compression.

According to a preferred embodiment, the access holes 320 are arranged such that the number of access holes exposed by the piston 201 increases in a non-linear manner as the piston 201 moves in the downstream direction. In other words, the cumulative surface area of the exposed access holes 320 increases by an increasing amount as the piston 201 moves in the downstream direction. FIG. 10 shows a pattern of access holes 320 for the access pipe 300 of the variable-demand flow regulator 10 according to the preferred embodiment. The number of exposed access holes 320 and the cumulative surface area of the exposed access holes 320 for different positions of the piston 201 along the access pipe 300 of the variable-demand flow regulator 10 is also listed in FIG. 10.

The access pipe 300 may be made from materials such as PVC, acrylic, and metal, for example.

Figure 6:
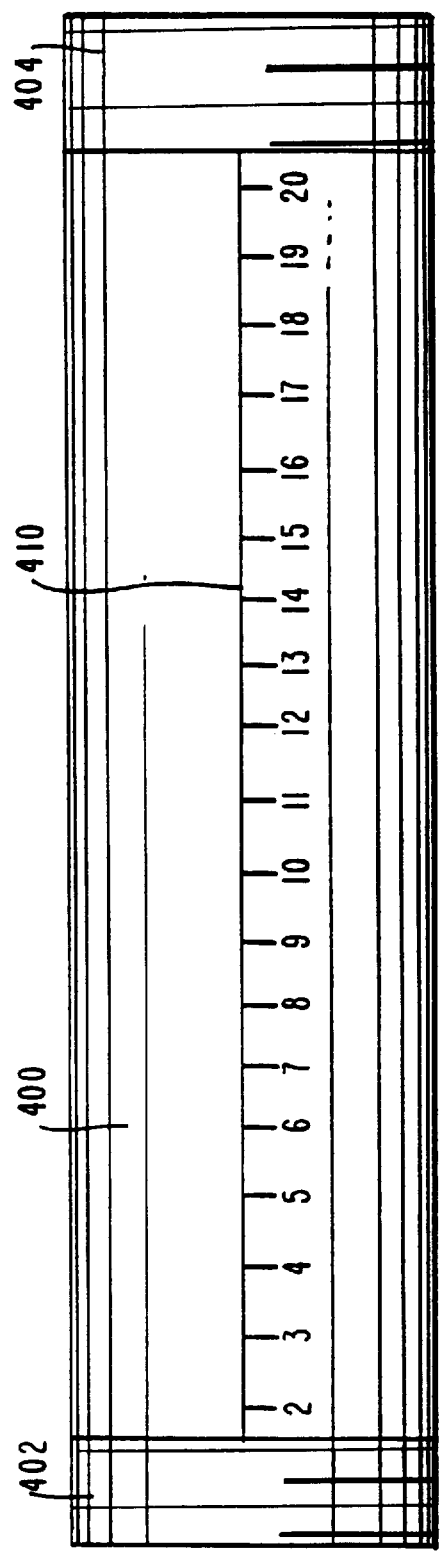
FIG. 6 is a side view of an outer casing of the variable-demand flow regulator of FIG. 2.

FIG. 6 is a side view of the outer casing 400 of the variable-demand flow regulator 10 of FIG. 2. The casing 400 has ends 402, 404 which respectively mate with the inlet flange 30 and the outlet flange 40, as shown in FIG. 2 The casing ends 402, 404 and the inlet and outlet flanges 30, 40 may include threaded sections for mating the pieces together. The casing 400 may optionally include indicia 410 such as an engraved or printed scale indicating the position of the piston 201 in units of inches, centimeters, and the like. The casing 400 may be made of a transparent material, such as acrylic, as well as PVC, for example.

Figure 7:
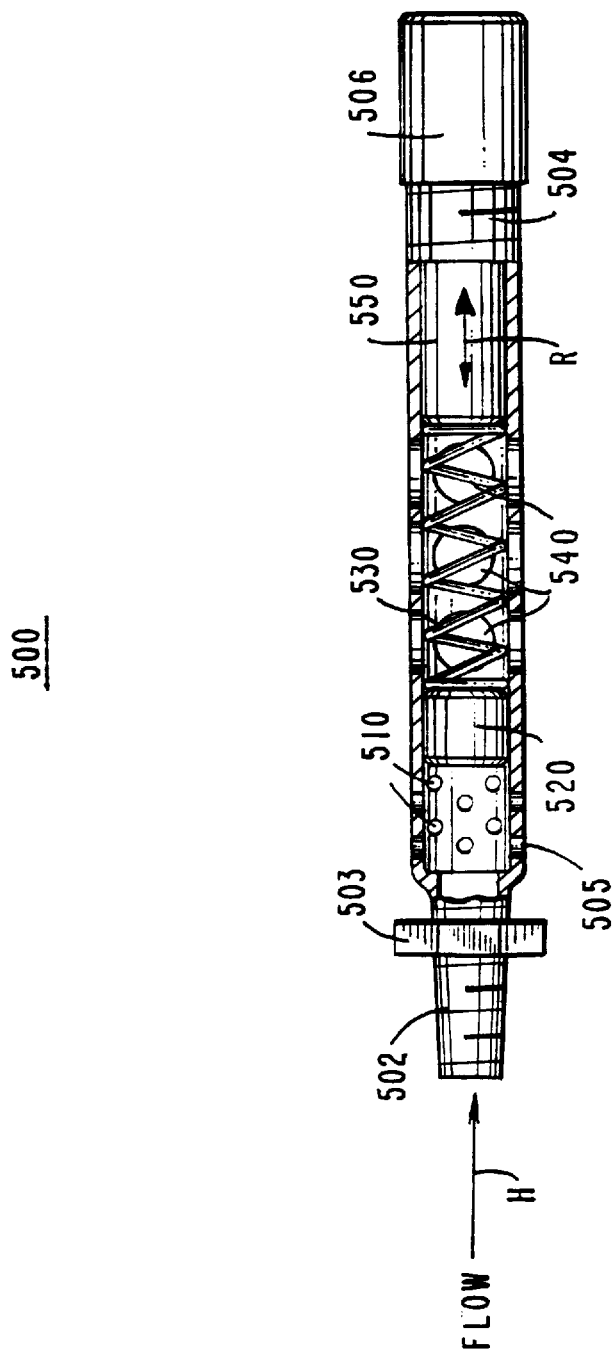
FIG. 7 is a cut-away view of a bleeder valve for use with the variable-demand flow regulator of FIG. 2.

FIG. 7 is a cut-away view of an adjustable bleeder valve 500 used for controlling the flow characteristics of the variable-demand flow regulator 10 of FIG. 2 by affecting the movement of the piston 201. FIG. 8A is a front view of the exit plate 600 of the variable-demand flow regulator 10 of FIG. 2 as seen along arrow B, and FIG. 8B is a side view of the exit plate 600 of the variable-demand flow regulator 10 of FIG. 2. The bleeder valve 500 includes an upstream end 502 that fits within an opening 610 of the exit plate 600. The bleeder valve 500 may be fixed to the exit plate 600 by a nut 503 to hold the bleeder valve 500 in place. The bleeder valve 500 includes a casing 505 having external bleed holes 510, which allow water that enters the bleeder valve 500 along arrow H to exit into the outlet flange 40. A spring 530 is located between a spacer 550 and a piston 520. The spacer 550 may be adjusted to move in the directions indicated by arrow R by rotating the end cap 506. Extra holes 540 in the casing 505 of the bleeder valve 500 allow additional water to flow into the outlet flange 40. The extra holes 540 are exposed when there is a high water pressure on the piston 520 pushing the piston 520 in a downstream direction against the action of the spring 530, or when the spacer 550 is retracted in a downstream direction by appropriate rotation of the end cap 506.

Figure 9A:
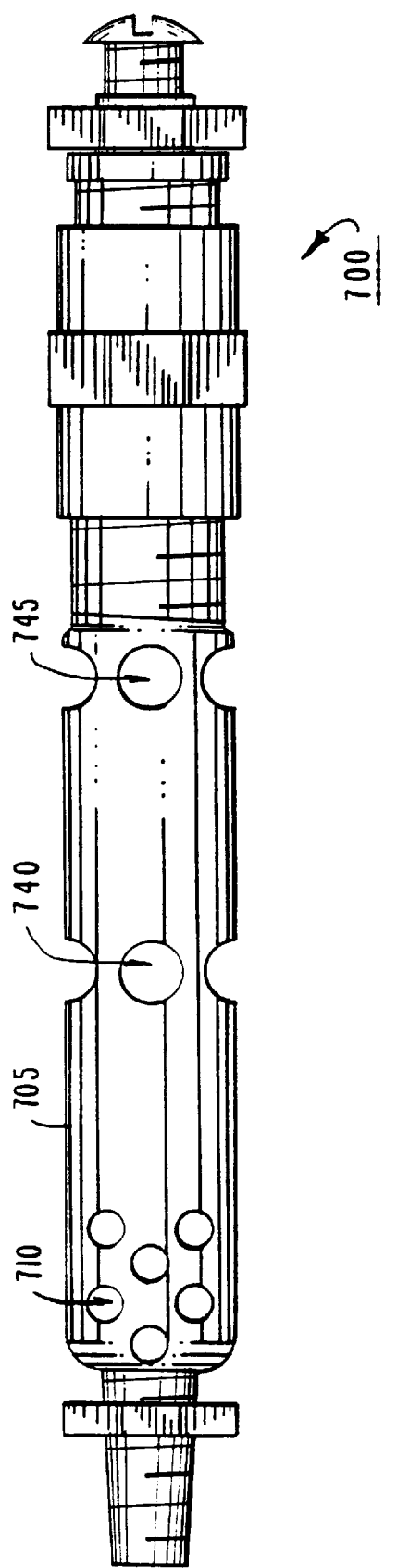
FIG. 9A is a plan view of a bleeder valve for use with the variable-demand flow regulator of FIG. 2.
Figure 9B:
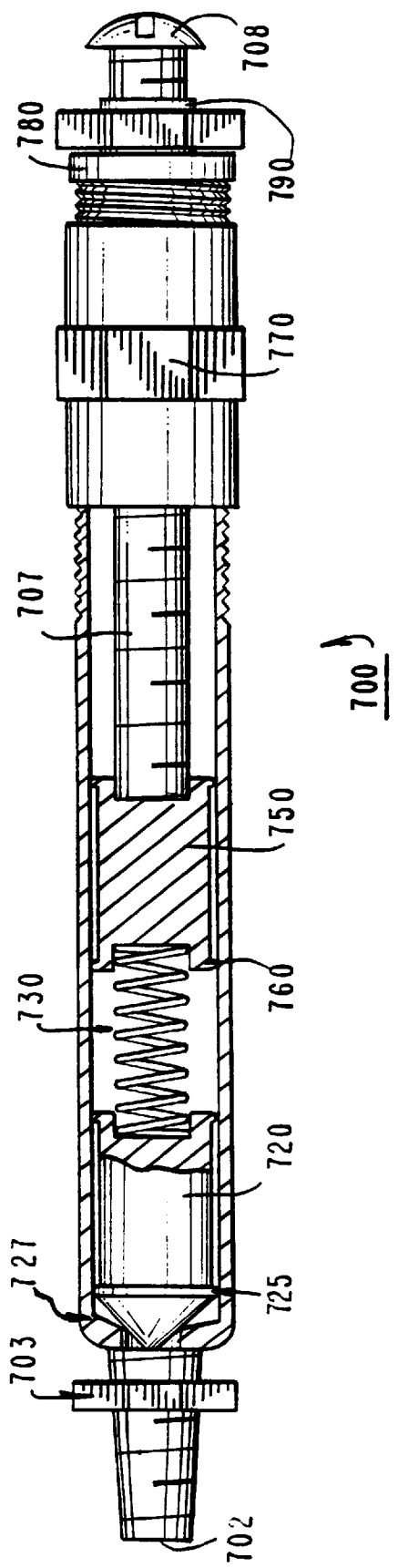
FIG. 9B is a cut-away view of the bleeder valve of FIG. 9A.

FIG. 9A is a side view and FIG. 9B is a cut-away view of a bleeder valve 700 according to a preferred embodiment. The bleeder valve 700 includes an upstream end. 702 that fits within an opening 610 of exit plate 600. The bleeder valve 700 may be fixed to the exit plate 600 by a nut 703 to hold the bleeder valve 700 in place. The bleeder valve 700 includes a casing 705 having external bleed holes 710 which allow water that enters the bleeder valve 700 to exit into the outlet flange 40. A compression spring 730 is located between a spacer 750 on the downstream side and a piston 720 on the upstream side. The piston 720 has a beveled upstream end 725 that may be used to shut off the bleeder valve 700 from water flow by blocking the nipple opening 727 in the bleeder valve 700. The spacer 750 may be adjusted to move in the axial directions by advancing or retracting a screw 707 connected to the spacer 750 by turning a head 708 of the screw 707. Extra holes 740, 745 in the casing 705 of the bleeder valve 700 allow additional water to flow into the outlet flange 40. The extra holes 740, 745 are exposed when there is a high water pressure on the piston 720 pushing the piston 720 in the downstream direction against the action of the compression spring 730, or when the spacer 750 is retracted towards the downstream direction by rotating the head 708 of the threaded rod 707 to retract the threaded rod 707. The positions of the extra holes 740, 745 enable various water bleed levels to be set up in the bleeder valve 700 depending on the position of the threaded rod 707 and the upstream water pressure pushing against the piston 720.

The bleed holes 710 need not be arranged as shown in FIG. 9A but instead may have other arrangements that achieve the purpose discussed above.

Optionally, more than one bleeder valve 500 or 700 may be used in the variable-demand flow regulator 10. When more than one bleeder valve 500 or 700 is used, each bleeder valve 500 or 700 is connected as described above.

The bleeder valve 500 or 700 may be serviced by using the bypass line 8 and bypass valves 4, 6 to redirect the flow of water away from the variable-demand flow regulator, as shown in FIG. 1.

The embodiments described above are illustrative examples of the present invention and it should not be construed that the present invention is limited to these particular embodiments. Various changes and modifications may be effected by one skilled in the art without departing from the spirit or scope of the invention as defined in the appended claims. For example, although the variable-demand. flow regulator of the present invention is described above in regard to regulating water flow to a building such as an apartment building, the present invention is also applicable for regulating water flow to other types of structures such as group homes, single family residences, and the like.

What is claimed is:

1. A variable-demand flow regulator system for regulating water flow to a water system of a building, the variable-demand flow regulator system comprising:

a water supply; and a regulator having an inlet connected to the water supply and an outlet connected to the water system of the building, the regulator including a bleeder valve for establishing desired water flow characteristics thereof, wherein the regulator automatically responds to variations in water demand by increasing water flow to the building when water demand increases and decreasing water flow to the building when water demand decreases.

2. A variable-demand flow regulator for regulating fluid flow based on a variable fluid supply pressure and a variable fluid demand pressure, the variable-demand flow regulator comprising:

a hollow housing having an inlet and an outlet;

a hollow longitudinal valve element disposed within the housing, the valve element having a closed inlet end, an open outlet end, and a wall enclosing a hollow interior, the wall containing a plurality of openings therethrough;

a piston disposed within the housing and circumscribing the valve element, the piston being longitudinally slidable about the wall of the valve element from a first position substantially covering the plurality of openings in the wall to a second position exposing at least one opening of the plurality of openings in the wall; and a bleeder valve connected to the housing, the bleeder valve controlling fluid flow characteristics by controlling movement of the piston, wherein an imbalance in fluid pressure between the inlet and the outlet of the housing causes the piston to slide along the wall of the valve element in response to the imbalance such that when the fluid pressure at the inlet of the housing is greater than the fluid pressure at the outlet of the housing, the fluid passes into the inlet of the housing and slides the piston along the wall of the valve element toward the outlet of the housing thereby exposing at least one opening of the plurality of openings in the wall, and the fluid flows through the exposed openings into the hollow interior of the valve element and then through the open outlet of the valve element, a balance in fluid pressure between the inlet and the outlet of the housing causes the piston to rest at an equilibrium position along the wall of the valve element, and the bleeder valve controls movement of the piston by affecting the balance of fluid pressure between the inlet and the outlet of the housing.

3. The variable-demand flow regulator of claim 2, further comprising compressing means disposed within the housing for providing a biasing pressure on the piston, the biasing pressure directed toward the inlet of the housing, wherein the compressing means is compressed by the piston when the fluid pressure at the inlet of the housing exceeds both the fluid pressure at the outlet of the housing and the biasing pressure of the compressing means.

4. The variable-demand flow regulator of claim 2, wherein the plurality of openings in the wall of the valve element are arranged in a pattern such that a cumulative surface area of the plurality of openings increases by an increasing amount from the inlet end of the valve element toward the outlet end of the valve element.

5. A variable-demand flow regulator comprising:

a hollow housing having an inlet end and an outlet end;

an access pipe disposed within the housing and having a closed inlet end, an open outlet end, and a plurality of access holes through a wall thereof, the outlet, end of the access pipe being in fluid communication with the outlet end of the housing;

a piston circumscribing a portion of the access pipe and disposed for sliding movement along the access pipe within the housing, the piston sliding between a position in which the plurality of access holes in the access pipe are covered and a position in which at least one access hole of the plurality of access holes is exposed;

compression means disposed within the housing for exerting a biasing force on the piston in a direction toward the inlet of the housing; and a bleeder valve connected to the housing for adjustably controlling flow characteristics through the housing by controlling movement of the piston, wherein fluid entering the inlet of the housing exerts a force on the piston in a direction toward the outlet of the housing such that when the force from the fluid exceeds the biasing force the piston moves in the direction toward the outlet of the housing to the position in which at least one access hole of the plurality of access holes is exposed, thereby allowing fluid to flow through the at least one exposed holes into an interior portion of the access pipe toward the outlet end of the access pipe and exit the housing through the outlet end of the housing, and the bleeder valve controls the movement of the piston by affecting a balance of fluid pressure between the inlet and the outlet of the housing.

6. The variable-demand flow regulator of claim 5, wherein the access holes are arranged in a pattern such that a cumulative surface area of the access holes increases by an increasing amount from the inlet end of the access pipe toward the outlet end of the access pipe.

7. The variable-demand flow regulator of claim 5, wherein the piston has small conduits extending therethrough from the inlet end of the housing to an intermediate chamber of the housing.

8. The variable-demand flow regulator of claim 7, wherein the bleeder valve is connected between the intermediate chamber and the outlet end of the housing, and the bleeder valve comprises:

a hollow casing having an inlet end in fluid communication with the intermediate chamber, a closed outlet end, and openings in a wall thereof for fluid flow from the inlet end of the casing to the outlet end of the housing;

a piston slidably disposed within the casing between a position covering the openings in the casing and a position in which at least one of the openings is exposed;

compressing means disposed within the casing for biasing the piston toward the inlet end of the casing;

adjustable positioning means for adjustably positioning the compressing means within the casing, wherein fluid entering the inlet end of the casing from the intermediate chamber of the housing exerts a pressure on the piston causing the piston to slide in a direction toward the closed end of the casing thereby exposing at least one of the openings in the casing to allow fluid flow between the intermediate chamber and the outlet end of the housing by way of the exposed openings in the casing of the bleeder valve.

9. The variable-demand flow regulator according to claim 8, wherein the openings in the bleeder valve are positioned in an arrangement that allows for various bleed levels, and the piston is positioned by the adjustable positioning means and the compressing means to expose various portions of the arrangement, thereby providing various bleed levels selectable by a user of the regulator.

10. The variable-demand flow regulator of claim 8, wherein the piston of the bleeder valve has a beveled inlet end that may be used to substantially block fluid flow from the intermediate chamber through the bleeder valve into the outlet end of the housing.

* * * * *